Dec. 19, 1944.   W. ANGST   2,365,443
POWER METER
Original Filed Nov. 9, 1940   3 Sheets-Sheet 1
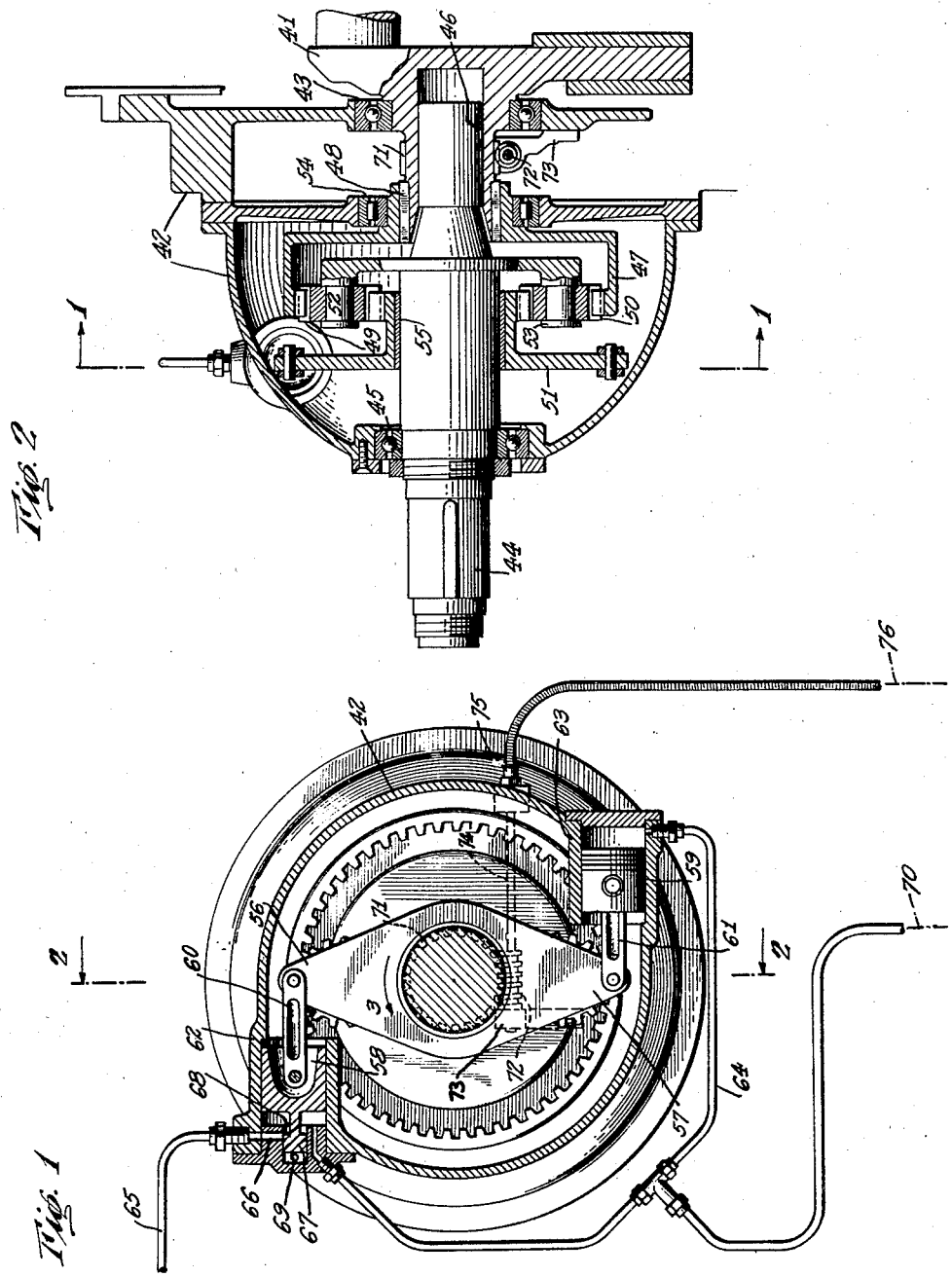
INVENTOR.
WALTER ANGST
BY
Furman Rinehart
ATTORNEY

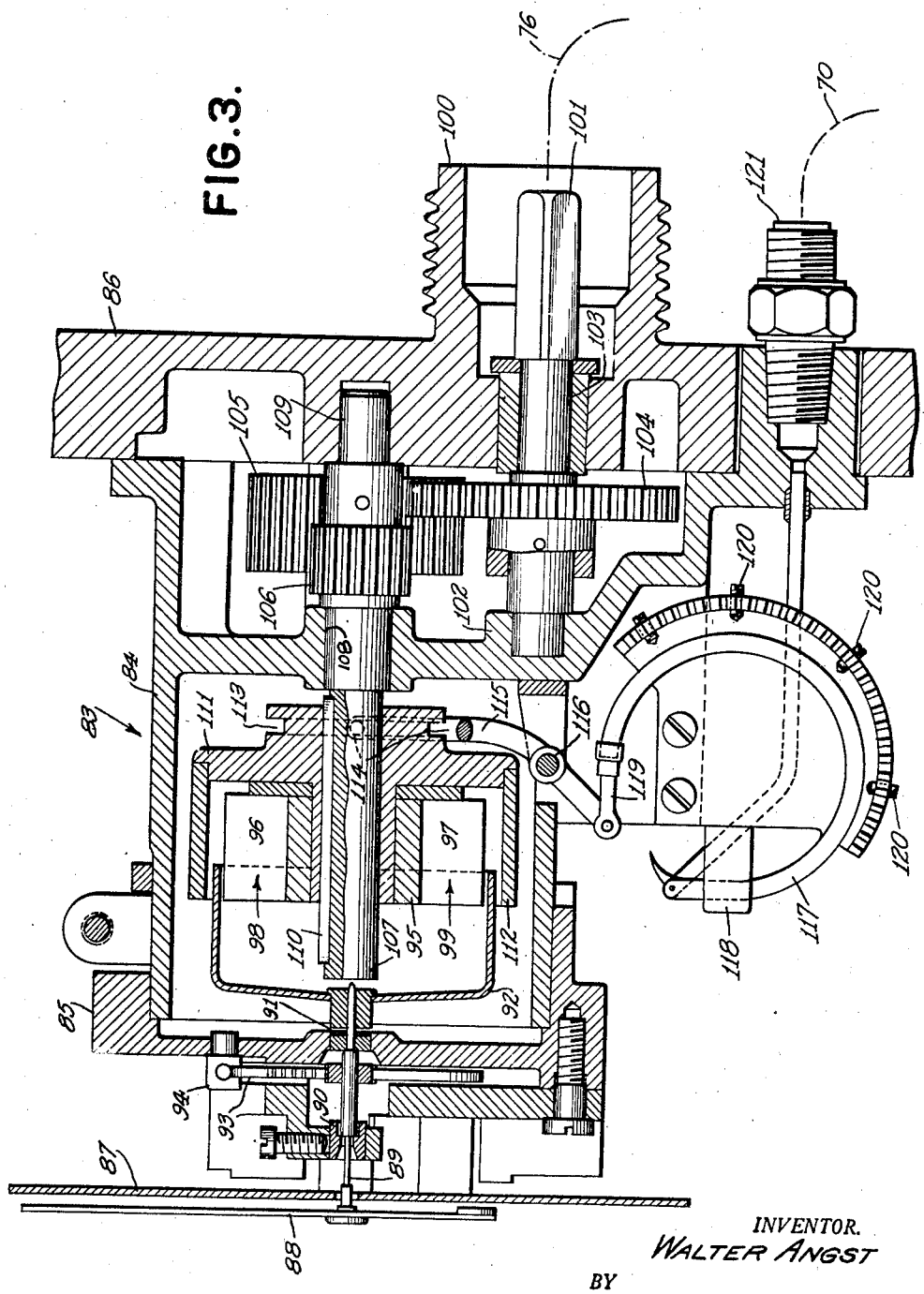

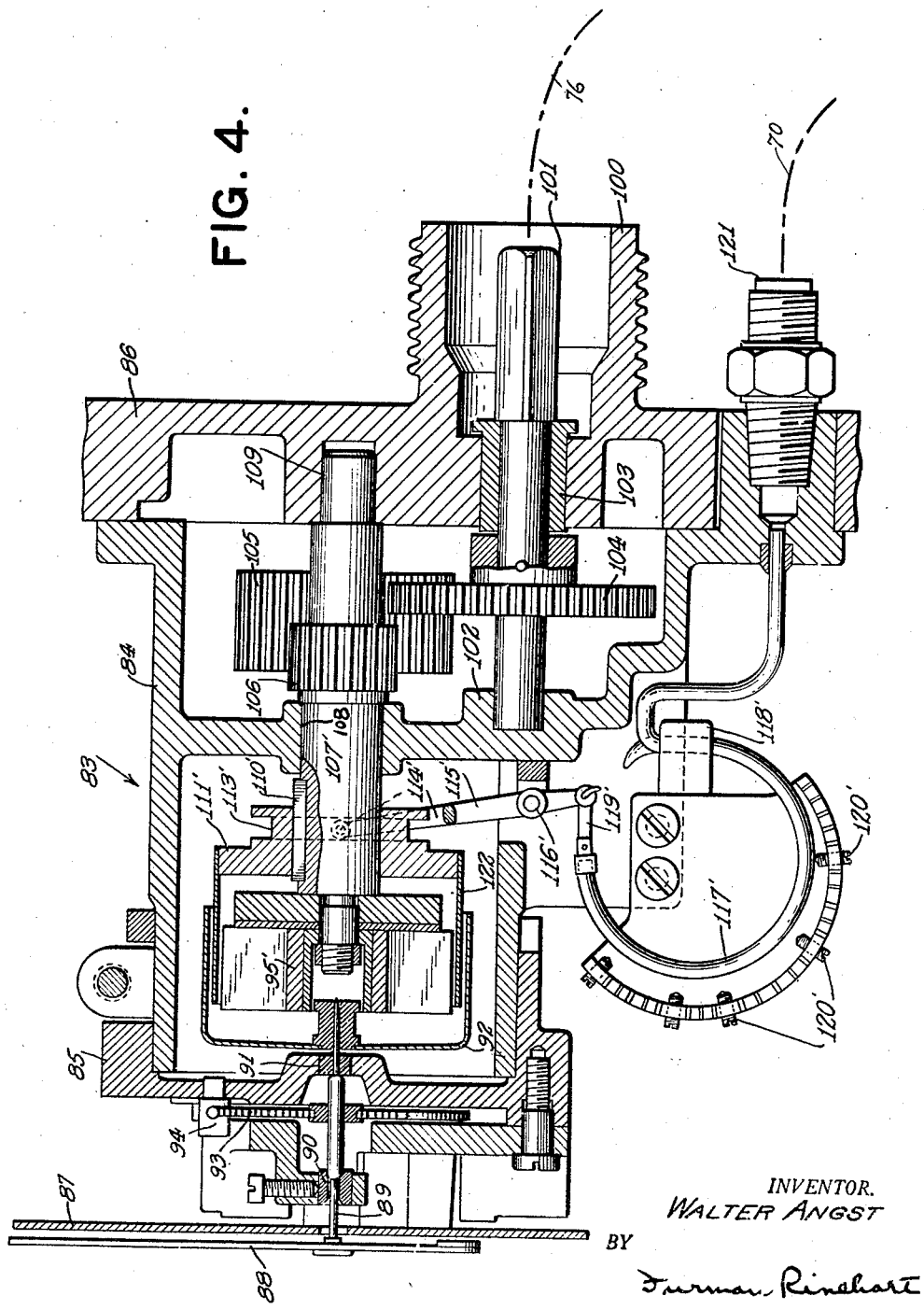

Patented Dec. 19, 1944

2,365,443

UNITED STATES PATENT OFFICE 2,365,443

POWER METER

Walter Angst, Manhasset, N. Y., assignor to Square D Company, Detroit, Mich., a corporation of Michigan Original application November 9, 1940, Serial No. 364,953. Divided and this application April 21, 1943, Serial No. 483,853

10 Claims. (Cl. 73—136)

The invention relates to power meters and more particularly to power meters for measuring the power delivered by an aircraft engine to its propeller. This application constitutes a division of parent application, Serial No. 364,953, filed November 9, 1940.

The invention in its preferred form comprises essentially a device for obtaining a first impulse proportional to the torque transmitted from an aircraft engine to its propeller, a second device for obtaining a second impulse proportional to the speed of the drive shaft, together with means for combining magnetically these two impulses to obtain a reading of delivered power.

In the preferred form, the torque impulse is obtained from a hydraulic planetary arrangement incorporated in the drive shaft by which a fluid pressure is generated proportional to torque. The speed impulse is obtained from an auxiliary shaft geared to the drive shaft. The torque and speed impulses are combined in an instrument casing having an instrument shaft driven by the auxiliary shaft. The instrument shaft carries a permanent magnet whose magnetic field operates upon a cup-shaped armature. The armature is connected to an indicating device biased by a spring, the indicating device being graduated to read in power units. The operation of the magnetic field by the magnet is variably controlled by the action of a Bourdon tube which in turn is operated by the pressure derived from the hydraulic planetary arrangement.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which:

Fig. 1 is a transverse section taken on the line 1—1 of Fig. 2 illustrating devices for deriving the torque and speed impulses for the power meter according to the invention;

Fig. 2 is a section taken on the line 2—2 of Fig. 1;

Fig. 3 is a longitudinal section through the casing of the instrument illustrating one manner of combining torque and speed to obtain a reading of power; and Fig. 4 is a longitudinal section similar to Fig. 3 illustrating another manner of combining torque and speed to obtain a power reading.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to Figs. 1, 2 and 3, the power meter of the invention is illustrated as measuring the power transmitted from an internal combustion engine used on an aircraft to an aircraft propeller. The power meter comprises essentially the torque responsive device and speed responsive device illustrated in Figs. 1 and 2, together with the indicating instrument illustrated in Fig. 3. The torque and speed responsive devices are associated with the drive shaft transmitting the power from the engine to the propeller. The torque impulse is transmitted to the indicating instrument through the flexible hydraulic conduit 70. The speed impulse is transmitted to the indicating instrument through the flexible auxiliary shaft 76.

The device for deriving a torque impulse from the drive shaft will first be described. This is illustrated as being of the pressure fluid type, responsive to the reaction exerted by the engine on its support. In Figs. 1 and 2 the end of the engine crank shaft 41 is shown as mounted in a motor casing or support 42 by means of a bearing 43. The engine crank shaft drives propeller shaft 44 mounted in bearings 45 and 46 through a planetary reduction gear incorporated in the drive shaft.

The reduction gear comprises a driving gear 47 keyed to the crankshaft at 48, a set of planetary gears, two of which are shown at 49 and 50, and a relatively stationary sun gear 51. The planetary gears 49 and 50 are mounted on arms 52 and 53 of the propeller shaft 44 to drive the same. The driving gear 47 may be supported in the engine casing 42 by means of a further bearing 54.

The relatively stationary sun gear 51 may be mounted on the propeller shaft by means of a bearing 55 and provided with two arms or lugs 56 and 57 for bracing the sun gear against rotation relatively to the engine casing.

In operation the driving gear 47 causes the planetary gears to revolve about the sun gear, thereby exerting a reaction torque on the sun gear which is proportional to the engine torque. From this reaction torque a pressure impulse may be derived by any suitable means, one convenient form being shown in Fig. 1.

The pressure fluid operated device of the illustrated embodiment comprises two pistons 58 and 59 connected to the arms 56 and 57 by means of piston rods 60 and 61. The pistons are movable in cylinders 62 and 63 mounted on, or forming part of, the housing 42. The spaces in the cylinders above the pistons are connected by a duct 64.

Pressure fluid from a suitable source (not shown) is supplied to the device through a supply duct 65 terminating at an intake port 66. The intake port is controlled in response to movements of the pistons relatively to the cylinders. In the illustrated embodiment, a sleeve valve is shown comprising a valve member 67 connected to, or forming part of, the piston 58. The sleeve valve has a control edge 68 cooperating with the intake port 66. The space above the control valve may be vented through a suitable vent hole 69.

The pressure fluid operated torque device operates as follows:

Reaction on the sun gear in the direction of the arrow 3 in Fig. 1 causes the piston 58 to move into the cylinder, thereby opening the intake port 66 to admit pressure fluid into the cylinder. The entering pressure fluid forces the piston in the opposite direction until the supply of pressure fluid is shut off. The pressure existing within the cylinder 62 is communicated to the cylinder 63 through the duct 64 and is proportional to the reaction on the sun gear and, accordingly, the torque of the engine.

The pressure impulse is transmitted to a pressure responsive device of suitable form through a duct 70 for modifying the action of the speed impulse on the movable member or indicator of the power responsive device.

A rotary motion proportional to the speed of the engine may also be derived at the device of Fig. 2, there being shown a worm and gear train for driving a flexible shaft. A worm wheel gear 71 is cut into or mounted on the crankshaft meshing with a worm 72 mounted in a bracket 73 on a shaft 74. The shaft 74 terminates at 75 in a suitable shaft coupling to which a flexible shaft 76 may be connected for actuating the speed responsive means.

Referring now to Fig. 3, the indicating device for combining the torque and speed impulses and for indicating the transmitted power will now be described. The combining device may be said to be of the drag or torque type. This consists of a movable armature upon which a torque is exerted in response to engine speed. The torque exerted on the armature may be counteracted by a second torque exerted by suitable means such as a spring. The angular position or deflection of the armature with respect to a zero position thus becomes a function of the engine speed. The second impulse proportional to the engine torque may be conveniently introduced by modifying one of the two torques acting on the movable armature in response to the engine torque whereby the angular position or deflection of the armature with respect to a zero position becomes a measure of the engine power.

The device shown in Fig. 3 comprises an instrument housing 83 in which the movable elements are mounted. The housing consists of a center portion 84 and two end members 85 and 86. To the front end member 85 there is mounted a dial 87 and a pointer 88 rotatably mounted by a shaft 89 in bearings 90 and 91. To the end of the pointer shaft 89 there is secured a movable armature shown in the form of a drum 92 cooperating with means for exerting a torque thereon. A means for exerting a bias on the shaft 89 is shown, in the illustrated embodiment, in the form of a hairspring 93 connected with its inner end to the pointer shaft 89 and with its outer end to a stud 94 fixed on the end member 85.

The means for exerting a torque on the movable armature may be of any suitable form and are shown in the illustrated embodiment as being a rotatable magnet 95 having adjoining radial pole pieces two of which are visible at 96 and 97 separated from poles of opposite polarity by means of air gaps 98 and 99.

The magnet is driven in proportion to engine speed by any suitable means such as the flexible shaft 76 connectible to a shaft coupling 100 including a driving shaft 101.

The driving shaft is mounted in bearings 102 and 103 and carries a gear 104 meshing with a gear 105. Gear 105 meshes with a further gear 106 on a shaft 107 mounted in bearings 108 and 109.

Gears 104, 105 and 106 thus form a step-up gear train for driving the magnet which is mounted on the shaft 107 to rotate therewith.

Means are provided for modifying at least one torque exerted on the pointer shaft 89 in response to the engine torque. This may conveniently be done by modifying the drag torque exerted on the armature.

The action of the permanent magnet 95 on the rotatable armature 92 in which the magnet tends to set up eddy currents to drag the same along may be increased and decreased in any convenient manner so as to increase and decrease the magnetic flux acting on the armature.

In Fig. 3 this is accomplished by decreasing and increasing the amount of telescoping of the armature and the permanent magnet. For this purpose the magnet is slidably mounted on the shaft 107 but prevented from rotation relatively to the shaft by means of a key 110.

In the illustrated embodiment the magnet 95 is mounted on a hub 111 to which there may be secured a soft iron sleeve 112 for providing a return path for the magnetic flux. The hub 111 has a circumferential groove 113 engaged by a fork-shaped member 114 for moving the hub and the magnet towards and away from the armature 92. The fork 114 may be formed as part of a double armed lever 115 pivoted at 116 and movable in response to changes in engine torque.

In the illustrated embodiment the torque responsive device is shown as being a Bourdon tube 117 fixedly mounted at 118 and connected with its movable end to the double armed lever 115 by means of a link 119.

The Bourdon tube may be provided with adjustable stops 120 and is shown as having a pipe coupling 121 for connection to the pressure impulse line 70 from a suitable torque responsive device such as shown in Figs. 1 and 2.

The operation of the device shown in Fig. 3 is as follows:

It may first be assumed that the amount of telescoping of the armature 92 and the rotatable magnet 95 is fixed. The pointer 88 will then make a deflection which is proportional to the speed at which the shaft 101 is driven which in turn is proportional to the engine speed.

This pointer movement is now increased and decreased in proportion to the engine torque by moving the magnet closer towards or away from the armature. An increase in pressure acting on the Bourdon tube will cause counter-clockwise motion of the double armed lever 115 about its pivot 116, thereby moving the magnet closer towards the armature and increasing the torque exerted thereon.

The pointer 88 will thus be actuated in joint response to two impulses, a speed and a torque impulse, and its position with respect to the zero point on the dial 87 will be proportional to the product of engine torque and speed.

Instead of varying the magnitude of the drag torque on the armature by moving the magnet towards and away from the armature, the magnet may be mounted at a fixed distance and the torque be modified by providing means for changing the magnitude of the magnetic flux. This may be accomplished either by providing a variable shield or a variable return path for the magnetic flux.

A modified form of the device of Fig. 3 is shown in Fig. 4 in which a magnetic shield is used for varying the torque exerted by the magnet on the armature. In Fig. 4 similar parts are designated by the same reference numerals as the corresponding parts in Fig. 3.

The magnet 95' is fixedly mounted on the end of the shaft 107'. The shaft 107' supports for axial movement the hub 111' carrying a magnetic shield or sleeve 122 movable into the air gap between the poles of the magnet 95 and the cylindrical part of the armature 92.

The hub 111' may be prevented from turning relatively to the shaft 107' by means of a key 110' and is adjustable in its position by means of a double armed lever 115' pivoted at 116' and terminating in a fork 114' engaging a circumferential groove 113' of the hub 111'.

A Bourdon tube 117' fixedly mounted at 118' is connected with its free end to the double armed lever 115' by means of a link 119'. Adjustable stops 120' may be provided for the Bourdon tube for calibrating its movement in response to changes in pressure.

The operation of the device shown in Fig. 4 is as follows:

The magnet 95' again exerts a torque on the armature 92 proportional to the engine speed at which the shaft 101 is driven. This torque may be increased and decreased depending on the relative position of the magnetic shield 122. In the position shown in the drawings, the torque is relatively small.

Upon an increase in engine torque and an increase in fluid pressure acting on the Bourdon tube 117', the tube will move the double armed lever 115' in clockwise direction thereby moving the magnetic shield 122 out of the air gap between the magnet and the armature resulting in an increase in torque on the armature.

The pointer 88 is thus moved in response to the joint action of the two impulses, engine speed and engine torque, and the dial may be graduated in units of engine power.

Thus a power meter has been disclosed which is simple, effective and accurate in operation. Since the combination of the speed and torque impulses takes place in the amplifying mechanism where the forces are small, the accuracy of indication of the device is high since the losses, such as bearing friction, are small. Obviously, the power indicated by the pointer is at all times a correct measure of the power transmitted from the engine to the load and is not affected by such operating conditions of the engine as quality of fuel, moisture and oxygen content of the combustion air, changes in pressure, timing of ignition, etc.

Obviously, the present invention is not limited to the particular embodiments herein shown and described. Other forms of devices for deriving impulses proportional to engine speed and torque may be used. Moreover, it is not indispensable that all the features of this invention be used conjointly since they may advantageously be employed in various combinations and sub-combinations.

What is claimed is:

1. A power meter for engines comprising, in combination, a rotatable magnetic element adapted to be driven proportional to the speed of the engine; a rotatable armature acted upon by the magnetic flux of said element; means for biasing said armature towards a predetermined rotary position; indicating means connected for movement by said armature to indicate the rotary position of said armature; and means responsive to the torque of the engine for moving said magnetic element in an axial direction for increasing and decreasing the action of the magnetic flux of said element on said armature, whereby said indicating means will be moved in response to the power of said engine.

2. A power meter for engines having a pressure fluid operated means for creating a fluid pressure proportional to the torque of the engine, said meter comprising, in combination, a rotatable magnetic element adapted to be driven proportional to the speed of the engine; a rotatable armature acted upon by said element; means for biasing said armature towards a predetermined rotary position; indicating means connected for movement by said armature to indicate the rotary position of the armature; and pressure responsive means for increasing and decreasing the magnetic flux from said element to said armature in response to changes in said fluid pressure, whereby said indicating means will be moved in response to the power of said engine.

3. A power meter for engines comprising, in combination, a rotatable magnetic element adapted to be driven proportional to the speed of the engine; a rotatable armature acted upon by the magnetic flux of said element; means for biasing said armature towards a predetermined rotary position; indicating means connected for movement by said armature to indicate the rotary position of said armature; and means responsive to the torque of the engine to cause relative axial movement between said magnetic element and armature for increasing and decreasing the magnetic flux between said element and said armature, whereby said indicating means will be moved in response to the power of said engine.

4. A power meter for engines having a pressure fluid operated means for creating a fluid pressure proportional to the torque of the engine, said meter comprising, in combination, a rotatable magnetic element adapted to be driven proportional to the speed of the engine; a rotatable armature disposed telescopically with relation to said magnetic element and acted upon by said element; means for biasing said armature towards a predetermined rotary position; indicating means connected for movement by said armature to indicate the rotary position of the armature; and pressure responsive means for increasing and decreasing the amount of telescoping between said element and said armature in response to fluid pressure, whereby said indicating means will be moved in response to the power of said engine.

5. A power meter for engines comprising, in combination, a rotatable magnetic element adapted to be driven proportional to the speed of the engine; a rotatable armature acted upon by said element; means for biasing said armature towards a predetermined rotary position; indicating means connected for movement by said armature to indicate the rotary position of said armature; and means responsive to the torque of the engine to cause movement of said magnetic element and armature toward and away from one another for increasing and decreasing the amount of magnetic flux passing from said element to said armature in response to engine torque, whereby said indicating means will be moved in response to the power of said engine.

6. A power meter for engines having a pressure fluid operated means for creating a fluid pressure proportional to the torque of the engine, said meter comprising, in combination, a rotatable armature; a first means including a magnetic element adapted to be driven proportional to the speed of the engine for exerting a torque on said armature; a second means adapted for biasing said armature toward a predetermined rotary position and for exerting an opposing torque on said armature when said armature is rotated; indicating means for indicating the rotary position of said armature; and pressure responsive means for causing said magnetic element to move axially toward and away from said armature for increasing and decreasing in response to said fluid pressure the torque exerted on said armature by said magnetic element, whereby said indicating means will be moved in response to the power of said engine.

7. A power meter for engines comprising, in combination, a rotatable armature; a rotatable magnetic first element adapted to be driven proportional to the speed of the engine; a second element in the form of a spring connected to exert a bias on said armature; an indicator for indicating the rotary position of said armature; and means responsive to the torque of said engine to cause said magnetic element to move axially toward and away from said armature for increasing and decreasing in response to the engine torque the torque exerted on said armature, whereby said indicating means will be moved in response to the power of said engine.

8. A power meter for engines comprising, in combination, a rotatable armature; a first means for producing a magnetic field and adapted to be driven proportional to the speed of the engine for exerting a torque on said armature; a second means for biasing said armature toward a predetermined rotary position; indicating means for indicating the rotary position of said armature; and torque responsive means responsive to the torque of said engine for causing said first means to move axially toward and away from said armature to vary the magnetic flux on said armature, whereby said indicating means will be moved in response to the power of said engine.

9. In a power meter for indicating power delivered through a drive shaft, hydraulic torque measuring device incorporated in said drive shaft, an instrument casing, an armature shaft journaled in said casing, a cup-shaped armature on said armature shaft, an instrument shaft journaled in said casing, a magnetic field member on and rotated by said instrument shaft, said magnetic field member comprising a permanent magnet having radial pole pieces and an outer sleeve member, said cup-shaped armature being disposed between said pole pieces and said outer sleeve member, said magnetic field member being axially slidable on said instrument shaft, a Bourdon tube connected to said hydraulic torque responsive device, a bracket supporting one end of said Bourdon tube, said magnetic field member having an annular groove, a forked member operating in said groove and pivoted to said instrument casing, a link connecting the end of said forked member and the free end of said Bourdon tube, an adjusting frame surrounding said Bourdon tube, a plurality of set screws in said adjusting frame to adjust the movement of said tube, drive means connecting said drive shaft and said instrument shaft, an indicator having a movable member and a stationary member, one of which constitutes a reference surface and the other of which constitutes a pointer, said reference surface being graduated to read in power units, means connecting said armature shaft to said movable member, and spring means for biasing said movable member.

10. In a power meter for indicating power delivered through a drive shaft, hydraulic torque measuring device incorporated in said drive shaft, an instrument casing, an armature shaft journaled in said casing, a cup-shaped armature on said armature shaft, an instrument shaft journaled in said casing, a magnetic field member on said instrument shaft comprising a permanent magnet having radial pole pieces disposed within said cup-shaped armature, a cylindrical shield member disposed between said pole pieces and said armature and axially slidable on said instrument shaft, a Bourdon tube connected to said hydraulic torque responsive device, a bracket supporting one end of said Bourdon tube, said shield member having an annular groove, a forked member operating in said groove and pivoted to said instrument casing, a link connecting the end of said forked member and the free end of said Bourdon tube, an adjusting frame surrounding said Bourdon tube, a plurality of set screws in said adjusting frame to adjust the movement of said tube, drive means connecting said drive shaft and said instrument shaft, an indicator having a movable member and a stationary member, one of which constitutes a reference surface and the other of which constitutes a pointer, said reference surface being graduated to read in power units, means connecting said armature shaft to said movable member, and spring means for biasing said movable member.

WALTER ANGST.